(12) United States Patent
Kim (10) Patent No.: US 8,576,576 B2
(45) Date of Patent: Nov. 5, 2013

(54) DISPLAY APPARATUS AND DRIVING CHIP MOUNTING FILM IN THE DISPLAY APPARATUS

(75) Inventor: Yun-Tae Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 195 days.

(21) Appl. No.: 13/012,537

(22) Filed: Jan. 24, 2011

(65) Prior Publication Data

US 2011/0267792 A1    Nov. 3, 2011

(30) Foreign Application Priority Data

May 3, 2010    (KR) .................. 10-2010-0041434

(51) Int. Cl.
*H05K 7/00*    (2006.01)

(52) U.S. Cl.
USPC ............ 361/783; 361/760; 361/787; 257/737

(58) Field of Classification Search
USPC .................. 361/783, 767, 760, 787; 345/204; 257/737
See application file for complete search history.

(56) References Cited

U.S. PATENT DOCUMENTS

| | | | |
|---|---|---|---|
| 6,771,348 B2 * | 8/2004 | Oh et al. .................. | 349/152 |
| 7,436,473 B2 * | 10/2008 | Nam et al. .................. | 349/110 |
| 2006/0033852 A1 * | 2/2006 | Kim .................. | 349/38 |
| 2006/0163724 A1 * | 7/2006 | Hwang et al. .................. | 257/737 |
| 2007/0216291 A1 | 9/2007 | Jung | |
| 2008/0001940 A1 | 1/2008 | Koh et al. | |
| 2008/0012474 A1 | 1/2008 | Sung et al. | |
| 2008/0036707 A1 | 2/2008 | Sung et al. | |
| 2009/0268146 A1 | 10/2009 | Kook et al. | |
| 2009/0279011 A1 | 11/2009 | Baek et al. | |
| 2010/0164363 A1 | 7/2010 | Sung et al. | |

FOREIGN PATENT DOCUMENTS

| | | |
|---|---|---|
| KR | 1020060060520 A | 6/2006 |
| KR | 1020070095030 | 9/2007 |
| KR | 1020070115317 | 12/2007 |
| KR | 1020080014260 A | 2/2008 |
| KR | 1020080038537 A | 5/2008 |
| KR | 1020090037333 A | 4/2009 |

OTHER PUBLICATIONS

Korean Office Action issued by KIPO on Sep. 27, 2011 in connection with Korean Patent Application Serial No. 10-2010-0041434 and Request for Entry of the Accompanying Office Action attached herewith.

* cited by examiner

*Primary Examiner* — Timothy Thompson
*Assistant Examiner* — Andargie M Aychillhum
(74) *Attorney, Agent, or Firm* — Robert E. Bushnell, Esq.

(57) ABSTRACT

A display apparatus and a driving chip mounting film in the display apparatus, capable of simplifying a manufacturing process and reducing a process time. The display apparatus includes an insulating substrate; a display device formed on the insulating substrate and for defining an image display unit; pads formed on the insulating substrate and electrically connected to the display device; a first circuit substrate disposed at and separate from a first side of the insulating substrate; and a number of driving chip mounting films including one-side ends electrically connected to the first circuit substrate, and other-side ends electrically connected to the pads. A number of driving chips are mounted on each of the number of driving chip mounting films.

17 Claims, 6 Drawing Sheets

DISPLAY APPARATUS AND DRIVING CHIP MOUNTING FILM IN THE DISPLAY APPARATUS

CLAIM OR PRIORITY

This application makes reference to, incorporates the same herein, and claims all benefits accruing under 35 U.S.C. §119 from an application for earlier filed in the Korean Intellectual Property Office on May 3, 2010 and there duly assigned Ser. No. 10-2010-0041434.

BACKGROUND OF THE INVENTION

1. Field of the Invention

The general inventive concept relates to a display apparatus.

2. Description of the Related Art

Currently, various light and small flat panel display apparatuses have been developed to replace heavy and large cathode ray tubes (CRTs). Theses flat panel display apparatuses include liquid crystal display (LCD) apparatuses, field emission display apparatuses, plasma display panels, and organic light emitting display apparatuses.

The above information disclosed in this Related Art section is only for enhancement of understanding of the background of the invention and therefore it may contain information that does not form the prior art that is already known to a person of ordinary skill in the art.

SUMMARY OF THE INVENTION

Aspects of the present invention provide for a display apparatus and a driving chip mounting film in the display apparatus, capable of simplifying a manufacturing process and reducing a process time.

According to an aspect of the present invention, there is provided a display apparatus including an insulating substrate; a display device formed on the insulating substrate and for defining an image display unit; pads formed on the insulating substrate and electrically connected to the display device; a first circuit substrate disposed at and separate from a first side of the insulating substrate; and a plurality of driving chip mounting films including one-side ends electrically connected to the first circuit substrate, and other-side ends electrically connected to the pads, wherein a plurality of driving chips are mounted on each of the plurality of driving chip mounting films.

Here, the plurality of driving chips may be data driving chips, and the pads may be electrically connected to the display device via data lines extending to the display device.

Here, the display apparatus may further include a second circuit substrate disposed at and separate from a second side of the insulating substrate; and a plurality of driving chip mounting films including one-side ends electrically connected to the second circuit substrate, and other-side ends electrically connected to the pads, and a plurality of driving chips may be mounted on each of the plurality of driving chip mounting films.

Here, the plurality of driving chips may be scan driving chips, and the pads may be electrically connected to the display device via scan lines extending to the display device.

Here, the first and second sides may be perpendicular to each other.

Here, each of the plurality of driving chip mounting films may include a plurality of mounting units for mounting the plurality of driving chips.

Here, each of the plurality of driving chip mounting films may include an insulating layer; and a wiring unit formed on the insulating layer and including conductor patterns, and the wiring unit may include a first mounting unit for mounting one driving chip; and a second mounting unit for mounting another driving chip.

According to another aspect of the present invention, there is provided a driving chip mounting film in a display apparatus, the film including an insulating layer; and a wiring unit formed on the insulating layer and including conductor patterns, wherein the wiring unit includes a plurality of mounting units for mounting a plurality of driving chips.

Additional aspects, features, and advantages of the present invention will become apparent from the following detailed description of the invention, the accompanying drawings, and the appended claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

While exemplary embodiments of the invention are susceptible to various modifications and alternative forms, specific embodiments thereof are shown by way of example in the drawings and will herein be described in detail. It should be understood, however, that there is no intent to limit exemplary embodiments of the invention to the particular forms disclosed, but conversely, exemplary embodiments of the invention are to cover all modifications, equivalents, and alternatives falling within the spirit and scope of the invention. In the following description of the present invention, a detailed description of known functions and configurations incorporated herein will be omitted when it may make the subject matter of the present invention unclear.

It will be understood that, although the terms first, second, etc. may be used herein to describe various elements, these elements should not be limited by these terms. These terms are only used to distinguish one element from another.

The terminology used herein is for the purpose of describing particular embodiments only and is not intended to be limiting of exemplary embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

Hereinafter, the present invention will be described in detail by explaining embodiments of the invention with reference to the attached drawings. Like reference numerals in the drawings denote like elements and thus repeated descriptions will be omitted.

Although an organic light emitting display apparatus will be representatively described as an example of a display apparatus, the present invention is not limited thereto and the technical idea of the present invention may be applied to various display apparatuses.

Figure 1:
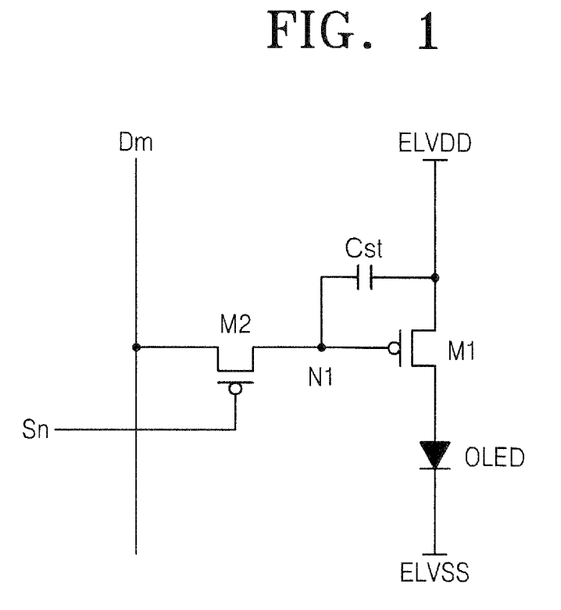
FIG. 1 is a circuit diagram of a pixel used in a display apparatus, according to an embodiment of the present invention.

FIG. 1 is a circuit diagram of a pixel used in a display apparatus, according to an embodiment of the present invention.

Referring to FIG. 1, the pixel may include a first transistor M1, a second transistor M2, a capacitor Cst and an organic light emitting diode (OLED).

The first transistor M1 may include a source electrode connected to a line of a first supply voltage ELVDD, a drain electrode connected to the OLED, and a gate electrode connected to a first node N1. The second transistor M2 may include a source electrode connected to a data line Dm, a drain electrode connected to the first node N1, and a gate electrode connected to a scan line Sn. The capacitor Cst includes a first electrode connected to the line of the first supply voltage ELVDD, and a second electrode connected to the first node N1. The OLED includes an anode connected to the drain electrode of the first transistor M1, a cathode connected to a line of a second supply voltage ELVSS, and an emission layer. If a current flows from the anode to the cathode of the OLED, the emission layer emits light according to the current. Equation 1 represents a current that flows through the drain electrode of the first transistor M1.

$$I_d = \frac{\beta}{2}(ELVDD - Vdata - Vth)^2 \quad \text{[Equation 1]}$$

Here, $I_d$ represents a current that flows through the drain electrode of the first transistor M1, Vdata represents a voltage of a data signal, ELVDD represents the first supply voltage applied to the source electrode of the first transistor M1, Vth represents a threshold voltage of the first transistor M1, and $\beta$ represents a constant.

Referring to FIG. 1, one pixel may include a plurality of signal lines. The signal lines may include the scan line Sn for transmitting a scan signal, and the data line Dm for transmitting a data signal. The scan line Sn is perpendicular to the data line Dm.

Figure 2:
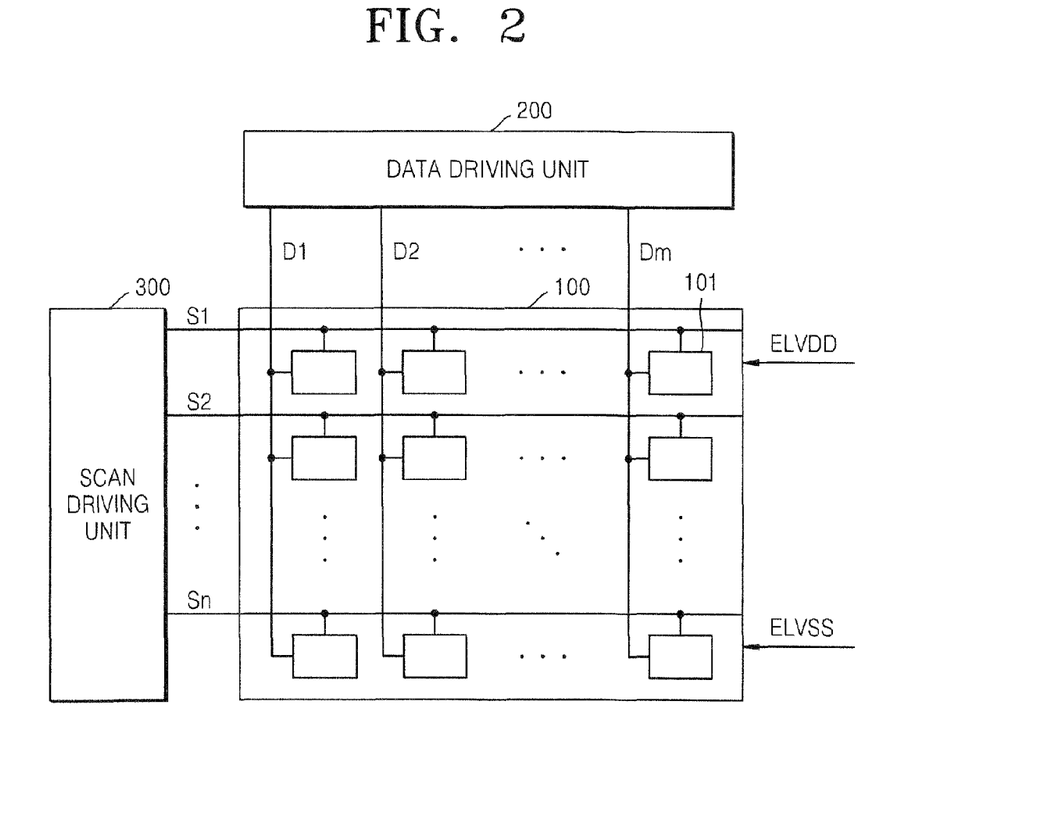
FIG. 2 is a block diagram of a display apparatus according to an embodiment of the present invention.

FIG. 2 is a block diagram of a display apparatus according to an embodiment of the present invention.

Referring to FIG. 2, the display apparatus according to the current embodiment may include an image display unit 100, a data driving unit 200, and a scan driving unit 300.

The image display unit 100 may include an array of a plurality of the pixels 101 each including an OLED for emitting light according to a current. On the image display unit 100, first through nth scan lines Si through Sn for transmitting a scan signal are arranged in row directions, and first through mth data lines Dl through Dm for transmitting a data signal are arranged in column directions. Accordingly, the image display unit 100 displays an image as the OLED emits light due to the scan signal, the data signal, and the first and second supply voltages ELVDD and ELVSS.

The data driving unit 200 is an element for applying the data signal to the image display unit 100, and generates the data signal by receiving video data having red, blue, and green components. The data driving unit 200 may be connected to the first through mth data lines D1 through Dm of the image display unit 100 and transmits the generated data signal to the image display unit 100 via the first through mth data lines D1 through Dm. According to an embodiment of the present invention, the data driving unit 200 may include a data circuit substrate, a plurality of driving chip mounting films, and a plurality of data driving chips mounted on each of the driving chip mounting films.

The scan driving unit 300 is an element for applying the scan signal to the image display unit 100, may be connected to the first through nth scan lines S1 through Sn, and transmits a scan signal to the image display unit 100. The data signal output from the data driving unit 200 may be transmitted to a pixel 101 to which the scan signal is transmitted, and thus a current is generated from the pixel 101 and flows through the OLED. According to an embodiment of the present invention, the scan driving unit 300 may include a scan circuit substrate, a plurality of driving chip mounting films, and a plurality of scan driving chips mounted on each of the driving chip mounting films.

Figure 3:
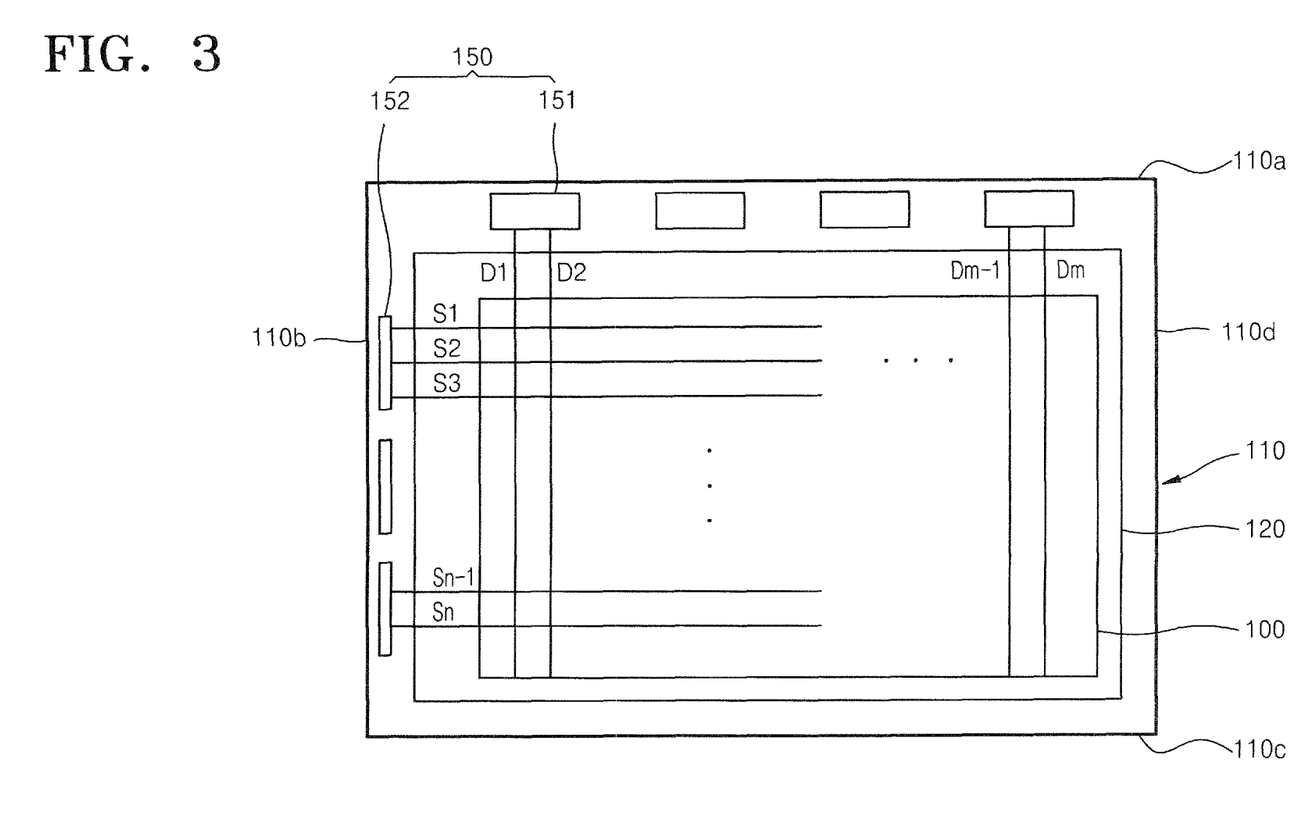
FIGS. 3 and 4 are structural diagrams of the display apparatus illustrated in FIG. 2, according to embodiments of the present invention.
Figure 4:
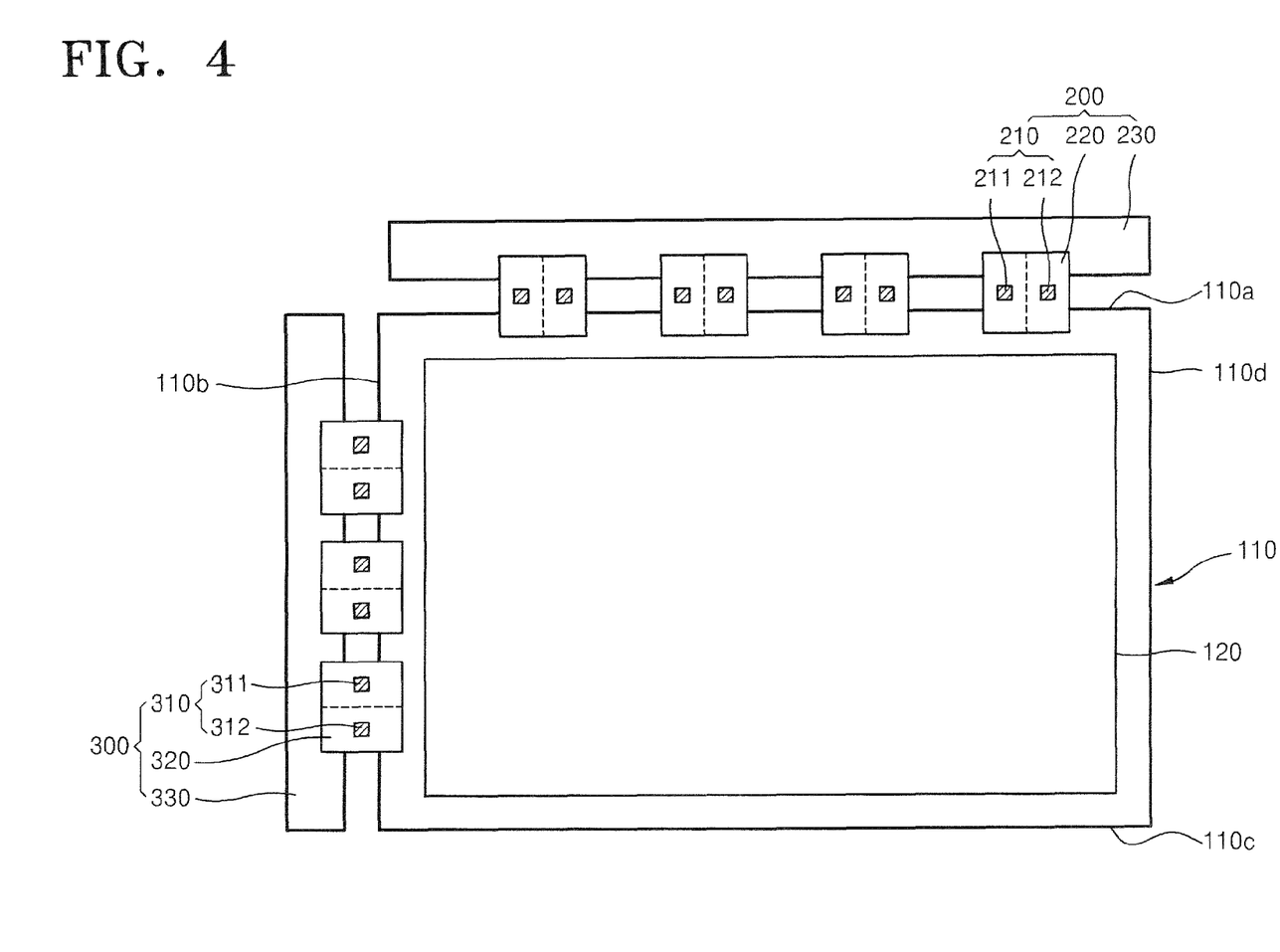

FIGS. 3 and 4 are structural diagrams of the display apparatus illustrated in FIG. 2, according to embodiments of the present invention.

In FIGS. 3 and 4, the data and scan driving units 200 and 300 are not illustrated. FIGS. 3 and 4 describes a region where an image is not displayed, instead of the image display unit 100. In FIGS. 3 and 4, only elements related to technical features of the present invention will be described in detail and other elements will not be illustrated or described.

Referring to FIG. 3, the display apparatus may include an insulating substrate 110, a sealing substrate 120, a display device for defining the image display unit 100, and a plurality of pads 150.

The insulating substrate 110 has a rectangular shape, and includes first and third sides 110a and 110c that are relatively long and face each other, and second and fourth sides 110b and 110d that are relatively short and face each other.

The sealing substrate 120 covers the insulating substrate 110 and is bonded to the insulating substrate 110 by using an adhesive applied on edges of the insulating substrate 110 and the sealing substrate 120.

The display device defines the image display unit 100, may include pixels 101 illustrated in FIG. 1, and displays an image as described above in relation to FIG. 1.

The pads 150 may be formed on the insulating substrate 110. In particular, the pads 150 may be formed on the region where an image is not displayed. The pads 150 may be electrically connected to the display device, and more particularly, may be electrically connected to the display device via the first through mth data lines D1 through Dm or the first through nth scan lines S1 through Sn extending to the display device. Also, the pads 150 may be electrically connected to one-side ends of driving chip mounting films (see 220 and 320 in FIG. 4) and may transmit a signal or a predetermined level voltage received from driving chips (see 210 and 310 in FIG. 4) mounted on the driving chip mounting films, to the display device. Furthermore, the pads 150 may be electrically connected to one-side ends of the driving chip mounting films and may transmit a signal or a predetermined level voltage received from circuit substrates (see 230 and 330 in FIG. 4) connected to the other-side ends of the driving chip mounting films, to the display device. The pads 150 may be formed of a wiring material, and may further include a conductive metal layer in addition to the wiring material. For example, the pads 150 may be formed of indium tin oxide (ITO) or indium zinc oxide (IZO).

Referring to FIG. 3, the pads 150 may include data pads 151 and scan pads 152. The data pads 151 may be electrically connected to the display device via the first through mth data lines D1 through Dm extending to the display device. The scan pads 152 may be electrically connected to the display device via the first through nth scan lines S1 through Sn extending to the display device. In FIG. 3, the data pads 151 are separated from each other by a constant distance along the first side 110a of the insulating substrate 110, on the region where an image is not displayed. Also, the scan pads 152 are separated from each other by a constant distance along the second side 110b of the insulating substrate 110, on the region where an image is not displayed. The numbers and positions of the data and scan pads 151 and 152 are not limited to as illustrated in FIG. 3. For example, one data pad 151 may be formed in a stripe shape along the first side 110a of the insulating substrate 110, on the region where an image is not displayed. Likewise, one scan pad 152 may be formed in a stripe shape along the second side 110b of the insulating substrate 110, on the region where an image is not displayed.

Referring to FIG. 4, the display apparatus may further include the data and scan driving units 200 and 300. In FIG. 4, the data and scan driving units 200 and 300 are added to the display apparatus illustrated in FIG. 3. Accordingly, elements described above in relation to FIG. 3 will not be described, and the added data and scan driving units 200 and 300 will be described.

The data driving unit 200 may include a data circuit substrate 230, a plurality of data driving chip mounting films 220, and a plurality of data driving chips 210 mounted on each of the data driving chip mounting films 220.

Each of the data driving chip mounting films 220 is an element for mounting the data driving chips 210, and may be a chip on film (COF) element, a tape automated bonding (TAB) element, or a tape ball grid array (TBGA) element. One-side ends of the data driving chip mounting films 220 are electrically connected to the data circuit substrate 230 and the other-side ends of the data driving chip mounting films 220 are electrically connected to the data pads 151 illustrated in FIG. 3. Since the data pads 151 are electrically connected to the display device via the first through mth data lines D1 through Dm illustrated in FIG. 3, the data driving chip mounting films 220 are also electrically connected to the display device. According to an embodiment of the present invention, a plurality of data driving chips 210 are mounted on each of the data driving chip mounting films 220. Although two data driving chips 210, e.g., a first data driving chip 211 and a second data driving chip 212, are mounted on each of the data driving chip mounting films 220 in FIG. 4, the present invention is not limited thereto. That is, three or more data driving chips 210 may be mounted on each of the data driving chip mounting films 220.

The data driving chips 210 may generate and apply a data signal or a predetermined level voltage to the display device or the data circuit substrate 230. For example, the data signal or the predetermined level voltage generated by the data driving chips 210 may be applied to the display device via the first through mth data lines D1 through Dm connected to the data driving chip mounting films 220 and the data pads 151. A data signal or a predetermined level voltage generated by the data circuit substrate 230 may be applied to the data driving chip mounting films 220, the data driving chips 210, and the display device.

The data circuit substrate 230 may be disposed at and may be separated from the first side 110a of the insulating substrate 110. The data circuit substrate 230 may be a printed circuit board (PCB). The data circuit substrate 230 may generate and apply a data signal or a predetermined level voltage to the display device or the data driving chips 210.

The scan driving unit 300 may include a scan circuit substrate 330, a plurality of scan driving chip mounting films 320, and a plurality of scan driving chips 310 mounted on each of the scan driving chip mounting films 320.

Each of the scan driving chip mounting films 320 may be an element for mounting the scan driving chips 310, and may be a COF element, a TAB element, or a TBGA element. One-side ends of the scan driving chip mounting films 320 are electrically connected to the scan circuit substrate 330 and the other-side ends of the scan driving chip mounting films 320 are electrically connected to the scan pads 152 illustrated in FIG. 3. Since the scan pads 152 may be electrically connected to the display device via the first through nth scan lines Si through Sn illustrated in FIG. 3, the scan driving chip mounting films 320 may be also electrically connected to the display device. According to an embodiment of the present invention, a plurality of scan driving chips 310 are mounted on each of the scan driving chip mounting films 320. Although two scan driving chips 310, e.g., a first scan driving chip 311 and a second scan driving chip 312, are mounted on each of the scan driving chip mounting films 320 in FIG. 4, the present invention is not limited thereto. Three or more scan driving chips 310 may be mounted on each of the scan driving chip mounting films 320.

The scan driving chips 310 may generate and apply a scan signal or a predetermined level voltage to the display device or the scan circuit substrate 330. For example, the scan signal or the predetermined level voltage generated by the scan driving chips 310 may be applied to the display device via the first through nth scan lines S1 through Sn connected to the scan driving chip mounting films 320 and the scan pads 152. A scan signal or a predetermined level voltage generated by the scan circuit substrate 330 may be applied to the scan driving chip mounting films 320, the scan driving chips 310, and the display device.

The scan circuit substrate 330 may be disposed at and may be separated from the second side 110b of the insulating substrate 110. The scan circuit substrate 330 may be a PCB. The scan circuit substrate 330 may generate and apply a scan signal or a predetermined level voltage to the display device or the scan driving chips 310.

The structure of the data or scan driving chip mounting films 220 or 320 in the display apparatus will now be described in detail.

Figure 5:
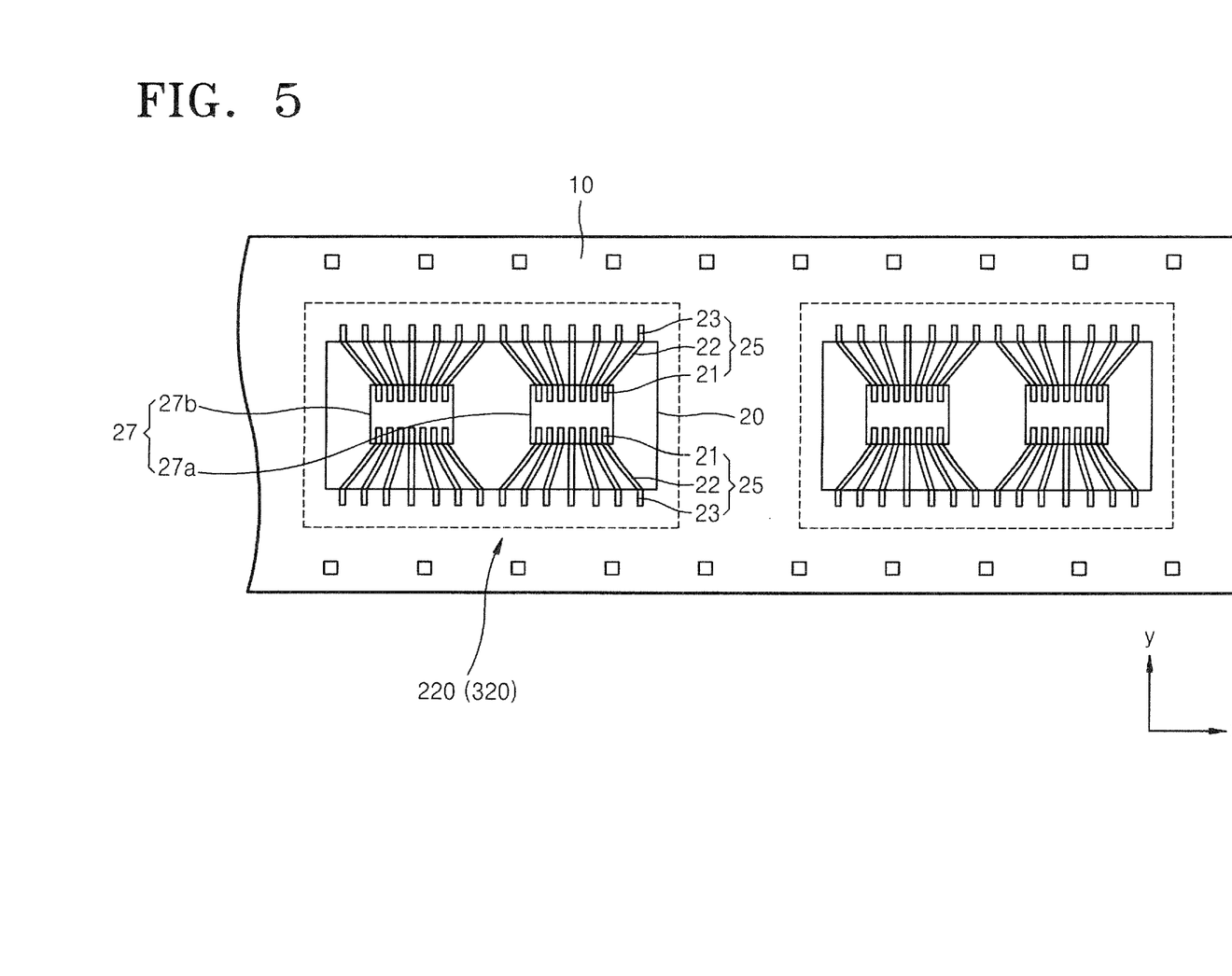
FIGS. 5 and 6 are schematic diagrams of a driving chip mounting film array for forming driving chip mounting films illustrated in FIG. 4, according to embodiments of the present invention.
Figure 6:
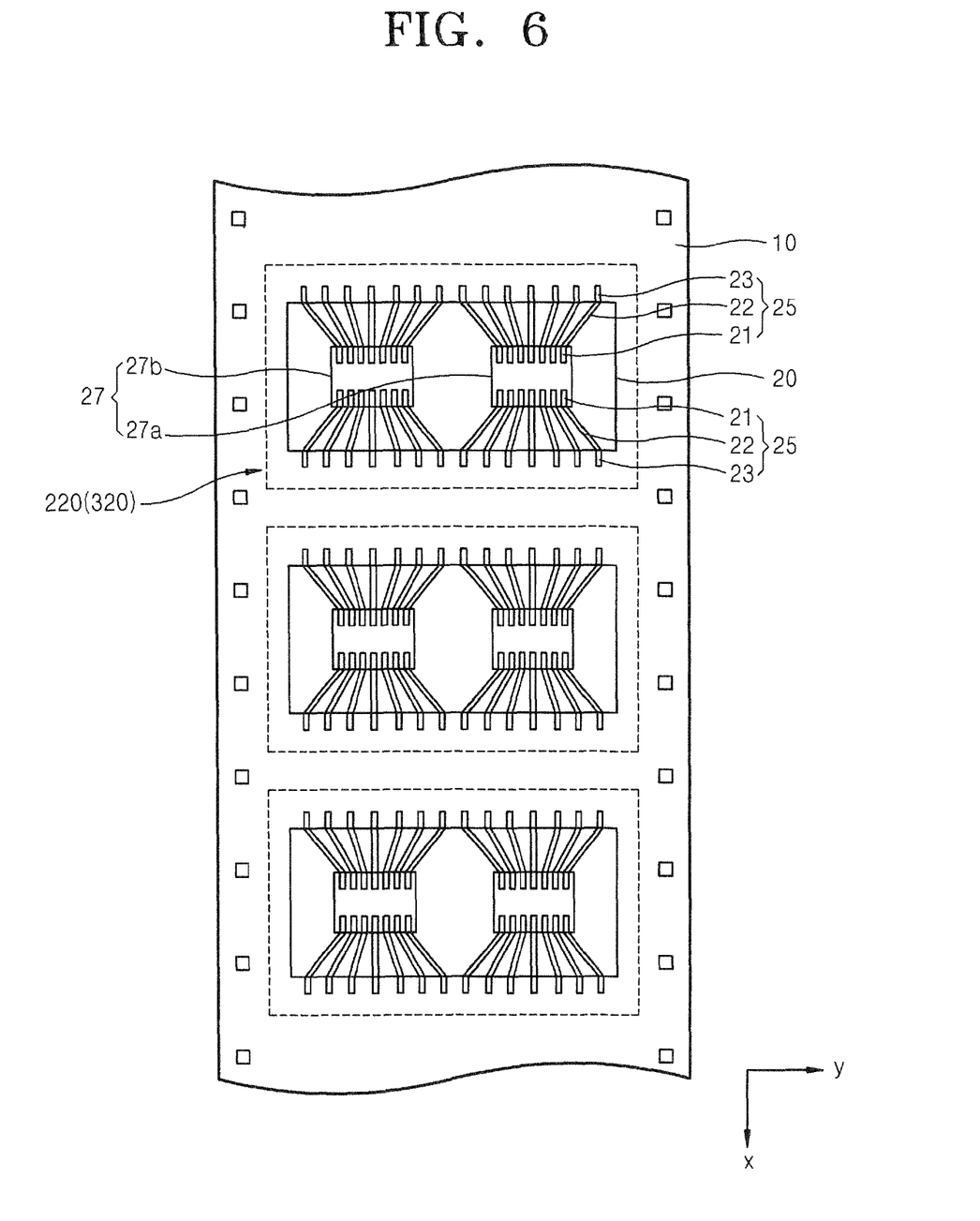

FIGS. 5 and 6 are schematic diagrams of a driving chip mounting film array for forming the data or scan driving chip mounting films 220 or 320 illustrated in FIG. 4, according to embodiments of the present invention.

Referring to FIGS. 5 and 6, the driving chip mounting film array may include an insulating layer 10 extending in an x-axis direction in the form of a stripe, and a plurality of data or scan driving chip mounting films 220 or 320 formed on the insulating layer 10. Each of the data or scan driving chip mounting films 220 or 320 may include the insulating layer 10 and a plurality of wiring units 20 each including a conductor pattern 25. In FIGS. 5 and 6, the data or scan driving chips 210 or 310 are not mounted on the data or scan driving chip mounting films 220 or 320, and dashed lines around the data or scan driving chip mounting films 220 or 320 represent punched lines along which the data or scan driving chip mounting films 220 or 320 are separated away from the driving chip mounting film array into individual elements.

Referring to FIG. 5, the insulating layer 10 may extend in the x-axis direction in the form of a stripe, and the data or scan driving chip mounting films 220 or 320 may be formed on the insulating layer 10. A manufacturer may separate the data or scan driving chip mounting films 220 or 320, formed on the insulating layer 10, along the punched lines into individual elements. The insulating layer 10 may be flexible and may be formed in a multilayer structure by using a polyimide-based resin. However, the material for forming the insulating layer 10 is not limited thereto.

The wiring units 20 are continuously formed on the insulating layer 10 or are separated by a predetermined distance. Referring to FIG. 5, a wiring unit 20 may include a rectangular mounting unit 27 for mounting a data or scan driving chip 210 or 310 at the center of the wiring unit 20. The wiring unit 20 may also include the conductor pattern 25 at two sides of the mounting unit 27 in a y-axis direction.

The mounting unit 27 refers to a region for mounting the data or scan driving chip 210 or 310. According to an embodiment of the present invention, a plurality of mounting units 27 are included in each of the data or scan driving chip mounting films 220 or 320. Although two mounting units 27, e.g., a first mounting unit 27a and a second mounting unit 27b, are included in each of the data or scan driving chip mounting films 220 or 320 in FIG. 5, the present invention is not limited thereto. That is, three or four mounting units 27 may be included in each of the data or scan driving chip mounting films 220 or 320.

The conductor pattern 25 may refer to a plurality of wires formed on the insulating layer 10, may include inner leads 21 formed on the mounting unit 27 and to be electrically connected to the data or scan driving chip 210 or 310 to be mounted on the mounting unit 27, outer leads 23 extending outside the wiring unit 201 or 202 and to be electrically connected to a pad 150, e.g., a data or scan pad 151 or 152, and a circuit substrate, e.g., a data or scan circuit substrate 230 or 330, and connection leads 22 for connecting the inner leads 21 and the outer leads 23 to each other. The conductor pattern 25 is formed of a conductor such as copper (Cu), gold (Au) or silver (Ag).

In FIG. 5, the data or scan driving chip mounting films 220 or 320 are arranged in such a way that the conductor pattern 25 is formed in a direction perpendicular to the direction in which the insulating layer 10 extends. On the other hand, in FIG. 6, the data or scan driving chip mounting films 220 or 320 may be arranged in such a way that the conductor pattern 25 is formed in a direction parallel to the direction in which the insulating layer 10 extends. If the data or scan driving chip mounting films 220 or 320 are arranged as illustrated in FIG. 6, the insulating layer 10 may be easily rolled in the direction in which the insulating layer 10 extends, i.e., the x-axis direction, and the wiring units 20 may be less damaged when rolling the insulating layer 10 in the x-axis direction. The data or scan driving chip mounting films 220 or 320 may be formed on the insulating layer 10 by using various methods in addition to the methods illustrated in FIGS. 5 and 6.

According to an embodiment of the present invention, a plurality of driving chips may be mounted on one driving chip mounting film and thus a manufacturing process of a display apparatus may be simplified and a process time may be reduced. Conventionally, one driving chip is mounted on one driving chip mounting film. For example, if eight driving chips are required to manufacture a display apparatus, eight driving chip mounting films have to be bonded to an insulating substrate and a circuit substrate. Accordingly, a bonding process should be performed eight times and thus a long process time is required. However, according to an embodiment of the present invention, a plurality of driving chips are mounted on one driving chip mounting film. For example, if two driving chips are mounted one driving chip mounting film, the display apparatus requires four driving chip mounting films. As such, the bonding process may be performed four times and thus the process time may be reduced by half, which may provide reduction in manufacturing cost and time in a manufacturing process of a large scale display apparatus, thereby greatly reducing financial losses.

In short, as a driving chip mounting film on which a plurality of driving chips are mounted is used, in comparison to a conventional manufacturing process of a display apparatus using a driving chip mounting film on which one driving chip is mounted, the number of times that a bonding process of driving chip mounting films to a display apparatus is performed may be reduced and thus a manufacturing process may be simplified and a process time may be reduced.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A display apparatus comprising:
an insulating substrate;
a display device formed on the insulating substrate and for defining an image display unit;
pads formed on the insulating substrate and electrically connected to the display device;
a first circuit substrate disposed at and separate from a first side of the insulating substrate; and a plurality of driving chip mounting films comprising one-side ends electrically connected to the first circuit substrate, and other-side ends electrically connected to the pads,
wherein a plurality of driving chips are mounted on each of the plurality of driving chip mounting films.

2. The display apparatus of claim 1, wherein the plurality of driving chips are data driving chips, and
wherein the pads are electrically connected to the display device via data lines extending to the display device.

3. The display apparatus of claim 1, further comprising:
a second circuit substrate disposed at and separate from a second side of the insulating substrate; and
a plurality of driving chip mounting films comprising one-side ends electrically connected to the second circuit substrate, and other-side ends electrically connected to the pads,
wherein a plurality of driving chips are mounted on each of the plurality of driving chip mounting films.

4. The display apparatus of claim 3, wherein the plurality of driving chips are scan driving chips, and
wherein the pads are electrically connected to the display device via scan lines extending to the display device.

5. The display apparatus of claim 3, wherein the first and second sides are perpendicular to each other.

6. The display apparatus of claim 3, wherein each of the plurality of driving chip mounting films comprises a plurality of mounting units for mounting the plurality of driving chips.

7. The display apparatus of claim 6, wherein each of the plurality of driving chip mounting films comprises:
an insulating layer; and
a wiring unit formed on the insulating layer and comprising conductor patterns, and
wherein the wiring unit comprises:
a first mounting unit for mounting one driving chip; and
a second mounting unit for mounting another driving chip.

8. The display apparatus of claim 1, wherein each of the plurality of driving chip mounting films comprises a plurality of mounting units for mounting the plurality of driving chips.

9. The display apparatus of claim 8, wherein each of the plurality of driving chip mounting films comprises:
an insulating layer; and
a wiring unit formed on the insulating layer and comprising conductor patterns, and
wherein the wiring unit comprises:
a first mounting unit for mounting one driving chip; and
a second mounting unit for mounting another driving chip.

10. A driving chip mounting film in a display apparatus, the film comprising:
an insulating layer; and
a wiring unit formed on the insulating layer and comprising conductor patterns,
wherein the wiring unit comprises a plurality of mounting units for mounting a plurality of driving chips.

11. A display apparatus, comprising:
an insulating substrate;
a display device formed on the insulating substrate defining an image display unit;
pads formed on the insulating substrate and electrically connected to the display device;
a first circuit substrate disposed at and separated from a first side of the insulating substrate, said first circuit substrate does not come into direct contact with said insulating substrate;
a plurality of driving chip mounting films comprising one-side ends electrically connected to the first circuit substrate, and other-side ends electrically connected to the pads; and
a plurality of driving chips mounted on each and every of the plurality of driving chip mounting films, said plurality of driving chip mounting films further comprising:
a plurality of data driving chip mounting films formed on an insulating layer;
a plurality of scan driving chip mounting films formed on the insulating layer;
a plurality of wiring units each including a conductor pattern electrically connected to each and every data and scan driving chip of a plurality of data driving chips and a plurality of scan driving chips,
wherein the insulating layer is in the form of a stripe.

12. The display apparatus of claim 11, wherein the pads are electrically connected to the display device via data lines extending to the display device.

13. The display apparatus of claim 12, wherein each of the plurality of driving chip mounting films comprises a plurality of mounting units for mounting the plurality of driving chips.

14. The display apparatus of claim 11, further comprising:
a second circuit substrate disposed at and separate from a second side of the insulating substrate; and
a plurality of driving chip mounting films comprising one-side ends electrically connected to the second circuit substrate, and other-side ends electrically connected to the pads,
wherein the plurality of driving chips are mounted on each and every one of the plurality of driving chip mounting films.

15. The display apparatus of claim 14, wherein the first and second sides are perpendicular to each other.

16. The display apparatus of claim 11, wherein each of the plurality of driving chip mounting films comprises a plurality of mounting units for mounting the plurality of driving chips.

17. The display apparatus of claim 11, wherein the wiring unit further comprise:
a first mounting unit for mounting one driving chip; and
a second mounting unit for mounting another driving chip.

* * * * *